United States Patent
Muraki et al.

(10) Patent No.: US 9,697,169 B2
(45) Date of Patent: Jul. 4, 2017

(54) ELECTRONIC DEVICE, MATHEMATICAL EXPRESSION DISPLAY CONTROL METHOD, AND STORAGE MEDIUM WHICH STORES MATHEMATICAL EXPRESSION CONTROL PROGRAM

(71) Applicant: CASIO COMPUTER CO., LTD., Shibuya-ku, Tokyo (JP)

(72) Inventors: Akiko Muraki, Hamura (JP); Yoshinaga Katayama, Kawasaki (JP); Sachiko Hirata, Ome (JP); Hiroshi Uejima, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 286 days.

(21) Appl. No.: 14/663,380

(22) Filed: Mar. 19, 2015

(65) Prior Publication Data
US 2015/0269115 A1    Sep. 24, 2015

(30) Foreign Application Priority Data

Mar. 20, 2014 (JP) .................. 2014-057662

(51) Int. Cl.
G06F 15/02 (2006.01)
(52) U.S. Cl.
CPC ................ G06F 15/0225 (2013.01)
(58) Field of Classification Search
CPC ................................................ G06F 15/0225
USPC ................... 708/130–146, 160–162
See application file for complete search history.

(56) References Cited

U.S. PATENT DOCUMENTS

| | | | | |
|---|---|---|---|---|
| 5,067,102 A | * | 11/1991 | Eisenstein | G06F 17/215 708/136 |
| 5,432,721 A | * | 7/1995 | Satoh | G06F 15/0225 708/168 |
| 5,680,638 A | * | 10/1997 | Satoh | G06F 17/215 708/142 |
| 2003/0041078 A1 | * | 2/2003 | Child | G06F 15/02 708/162 |
| 2007/0226283 A1 | * | 9/2007 | Uejima | G06F 15/02 708/130 |
| 2008/0244403 A1 | * | 10/2008 | Kaneko | G06F 9/4446 715/711 |
| 2011/0131261 A1 | * | 6/2011 | Jacobson | G06F 15/0225 708/131 |

FOREIGN PATENT DOCUMENTS

JP     2007264765 A    10/2007
JP       4126495 B2     7/2008

* cited by examiner

*Primary Examiner* — Tan V. Mai
(74) *Attorney, Agent, or Firm* — Holtz, Holtz & Volek PC

(57) ABSTRACT

According to one embodiment, an electronic device including: a display unit; and a processor configured to: accept an input of numerical expression data comprising an input field-equipped function data with one or plural input fields; cause the display unit to display the numerical expression data and a cursor; move, upon accepting a first user operation, the cursor from one element to a next or previous element, the element being a constituent of numerical expression data; and move, upon accepting a second user operation when the cursor is present in the input fields, the cursor to an outside of the input field-equipped function data with the input fields.

9 Claims, 11 Drawing Sheets

ELECTRONIC DEVICE, MATHEMATICAL EXPRESSION DISPLAY CONTROL METHOD, AND STORAGE MEDIUM WHICH STORES MATHEMATICAL EXPRESSION CONTROL PROGRAM

CROSS-REFERENCE TO RELATED APPLICATIONS

This application is based upon and claims the benefit of priority from Japanese Patent Application No. 2014-057662, filed Mar. 20, 2014, the entire contents of which are incorporated herein by reference.

BACKGROUND OF THE INVENTION

1. Field of the Invention

The present invention relates generally to an electronic device, a mathematical expression display control method, etc., which control cursor movement at a time of inputting a mathematical expression.

2. Description of the Related Art

Conventionally, in most of electronic calculators which are called "scientific calculators", a mathematical expression, which is key-input by a user, or a calculation result of the mathematical expression is displayed in one line as such.

In recent years, there have been scientific calculators which adopt "mathematically natural display" in which a mathematical expression is displayed in such a natural form as described in school textbooks, etc. Since the "mathematically natural display" is a mode as described in school textbooks, etc., this mode is easy to understand and convenient even in a case of a complex mathematical expression.

On the other hand, compared to one-line display adopted in conventional scientific calculators, the "mathematically natural display" tends to become cumbersome and complex since the input and edit of a mathematical expression involves a greater number of steps. For example, in an "integral function" of a special arithmetic operation, there are three input positions, namely a numerical expression part, an infimum part and a supremum part, and a plurality of numerical expression constituents (e.g. a numeral, a variable, an arithmetic sign, etc.) can be input to each position. Thus, in the case where a plurality of numerical expression constituents were input to each of the numerical expression part, infimum part and supremum part, multiple-time operations for cursor movement need to be performed in each of the numerical expression part, infimum part and supremum part, in order to move the cursor in the mathematical expression. In addition, in the case of moving the cursor from the inside of the numerical expression of the "integral function" to an outside numerical expression part, the cursor has to move via the respective numerical expression constituents, i.e. the numerical expression part, infimum part and supremum part, and the number of times of operation for cursor movement becomes larger.

Besides, in a special arithmetic operation such as "integral function", for example, numerical expression constituents are input in the order of the numerical expression part, infimum part and supremum part in accordance with a mathematical rule. Thus, the cursor is also moved in the order corresponding to the mathematical rule, in association with the operation of moving the cursor in a certain direction. For example, if an operation of moving the cursor to the right is repeated when the cursor is present in the numerical expression part, the cursor is moved to the infimum part positioned on the left side of the numerical expression part, that is, to the left.

Conventionally, a technique has been thought in which, in the case where a function expression of a special arithmetic operation, such as "integral function", is displayed, an optimal movement destination corresponding to a current cursor position in a numerical expression is searched in accordance with an instruction to move the cursor, and the cursor is moved to the optimal movement destination (see, for example, Jpn. Pat. Appln. KOKAI Publication No. 2007-264765).

BRIEF SUMMARY OF THE INVENTION

In a conventional scientific calculator, when a function expression is displayed by "mathematically natural display", a plurality of input positions exists, in particular, in a function expression of a special arithmetic operation. Thus, the cursor is moved at a numerical expression constituent which was input at each input position. Accordingly, in some cases, many operations are required in order to move the cursor within a function expression of a special arithmetic operation, or in order to move the cursor to a numerical expression outside the function expression of the special arithmetic operation.

In addition, the order, in which the cursor is moved in accordance with an instruction for cursor movement, follows the mathematical rule. Thus, when the cursor is moved within the mathematical expression of a special arithmetic operation, there has been a case in which the direction of movement of the cursor, which was instructed by an operation, differs from the direction of actual movement of the cursor. This being the case, in a mathematical expression in which a function expression of a special arithmetic operation and an ordinary function expression are mixed, it has been necessary to selectively use operations of moving the cursor, in accordance with the current position of the cursor.

The object of the invention is to provide an electronic device, a mathematical expression display control method, etc., which can easily move a cursor to an arbitrary position within a mathematical expression which is displayed by mathematically natural display.

Solution to Problem

In general, according to one embodiment, an electronic device comprising: a display unit; and a processor configured to: accept an input of numerical expression data comprising an input field-equipped function data with one or plural input fields; cause the display unit to display the numerical expression data and a cursor; move, upon accepting a first user operation, the cursor from one element to a next or previous element, the element being a constituent of numerical expression data; and move, upon accepting a second user operation when the cursor is present in the input fields, the cursor to an outside of the input field-equipped function data with the input fields.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter with reference to the accompanying drawings.

Figure 1:
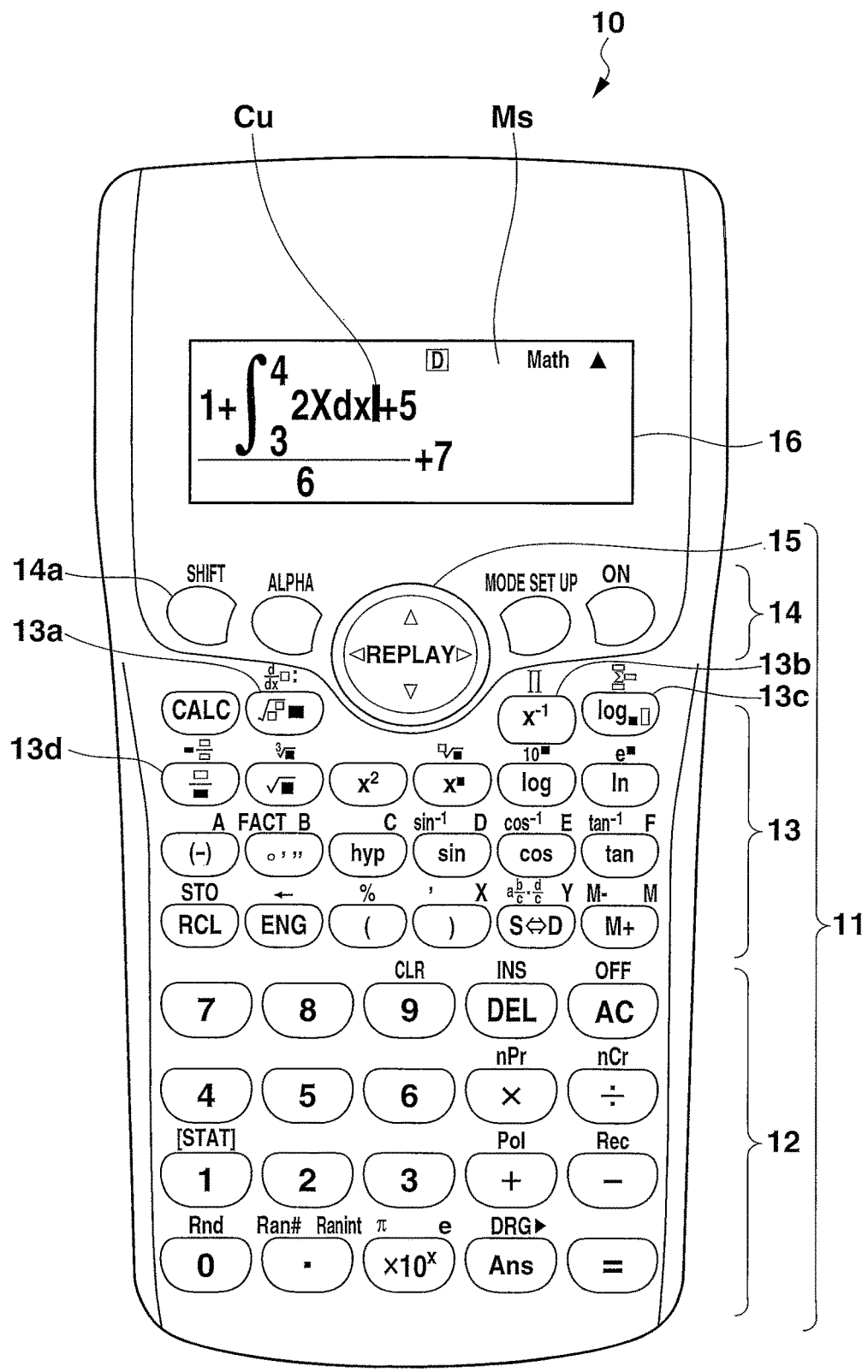
FIG. 1 is a front view illustrating an external appearance structure of a scientific calculator according to an embodiment of a mathematical expression display control device in the present embodiment.

FIG. 1 is a front view illustrating an external appearance structure of a scientific calculator 10 according to an embodiment of an electronic device of the present invention.

The electronic device is configured as a mobile device (scientific calculator 10) dedicated to calculations, which will be described below, or is configured as a touch panel-type PDA (personal digital assistant), a PC (personal computer), a mobile phone, an electronic book, a mobile game console, etc., each having a calculation function.

Because of a need for portability, the scientific calculator 10 is configured to have a small size so that the user can surely hold the scientific calculator 10 by one hand, and can operate it by one hand. A key input unit 11 and a display unit 16 are provided on the front surface of the main body of the scientific calculator 10.

The key input unit 11 includes a numerical value/arithmetic sigh key group 12 for inputting numerical values and numerical expressions and instructing execution of calculations; a scientific function key group 13 for inputting various scientific functions and operational functions; a mode setting key group 14 for displaying a menu screen of various operation modes and for instructing the setting of an operation mode; and a cursor key 15 for performing an operation of moving a cursor Cu which is displayed on the display unit 16, and for performing an operation of selecting data items.

As the numerical value/arithmetic sigh key group 12, the following keys are arranged: [0]~[9] (numerical value) keys, and variable keys (character keys; combined with [ALPHA] key) [A]~[F], [X] and [Y], which are character keys; and [+], [−], [x] and [÷] (four-rule arithmetic signs) keys, [ sin] (sine) key, [ cos] (cosine) key, and [ log] key, which are other function keys.

In the present embodiment, a function, such as integration "∫", product "Π", sum "Σ", root "√", fraction "a/b", mixed fraction "c(a/b)" or a power function, which requires display with use of a special sign in one-line display, and requires, in natural display as in school textbooks, display in which numerals and functional signs are developed two-dimensionally and overlapped in an up-and-down direction, is referred to as "2D (dimension) function". The display mode of the 2D function is referred to as "mathematically natural display". In a function involving natural display, for example, in an integral function, a numerical value of a supremum and a numerical value of an infimum of an integration range are written above and below an integral sign, and a numerical expression that is an object of integration is written after these numerical values. If an integral key is pressed, three input fields for two-dimensionally inputting the numerical values and numerical expression in this manner are displayed. In the description below, a function, such as a function of an integral key, by which input fields are displayed, is referred to as "input field-equipped function".

As the input field-equipped function key group 13 with one or plural input fields, the following keys are arranged. An integral key 13a, a product key 13b (combined with [SHIFT] key), a summation key 13c (combined with [SHIFT] key) and a mixed fraction key 13d (combined with [SHIFT] key) are arranged as input field-equipped function keys with three input fields. An $X^\square$ key ($\square^\square$), a radical root ($^\square\sqrt{\square}$) key (combined with [SHIFT] key), and a mixed fraction key 13d are arranged as input field-equipped function keys with two input fields. In addition, [√☐] (root) key, and a $10^x$ key ($10^\square$) are arranged as input field-equipped function keys with one input field.

As the mode setting key group 14, a [MODE] key, a [SHIFT] key 14a and an [ON] (power) key are arranged. Besides, a mathematical expression execution key [=] for executing a calculation of a mathematical expression, and an [Ans] key for using a calculation result in a new calculation expression are provided.

The display unit 16 is composed of a dot-matrix-type liquid crystal display unit. On the display unit 16, a mathematical expression and a cursor Cu are displayed. In addition, calculation modes and various setting states are displayed on a state display area Ms.

Figure 2:
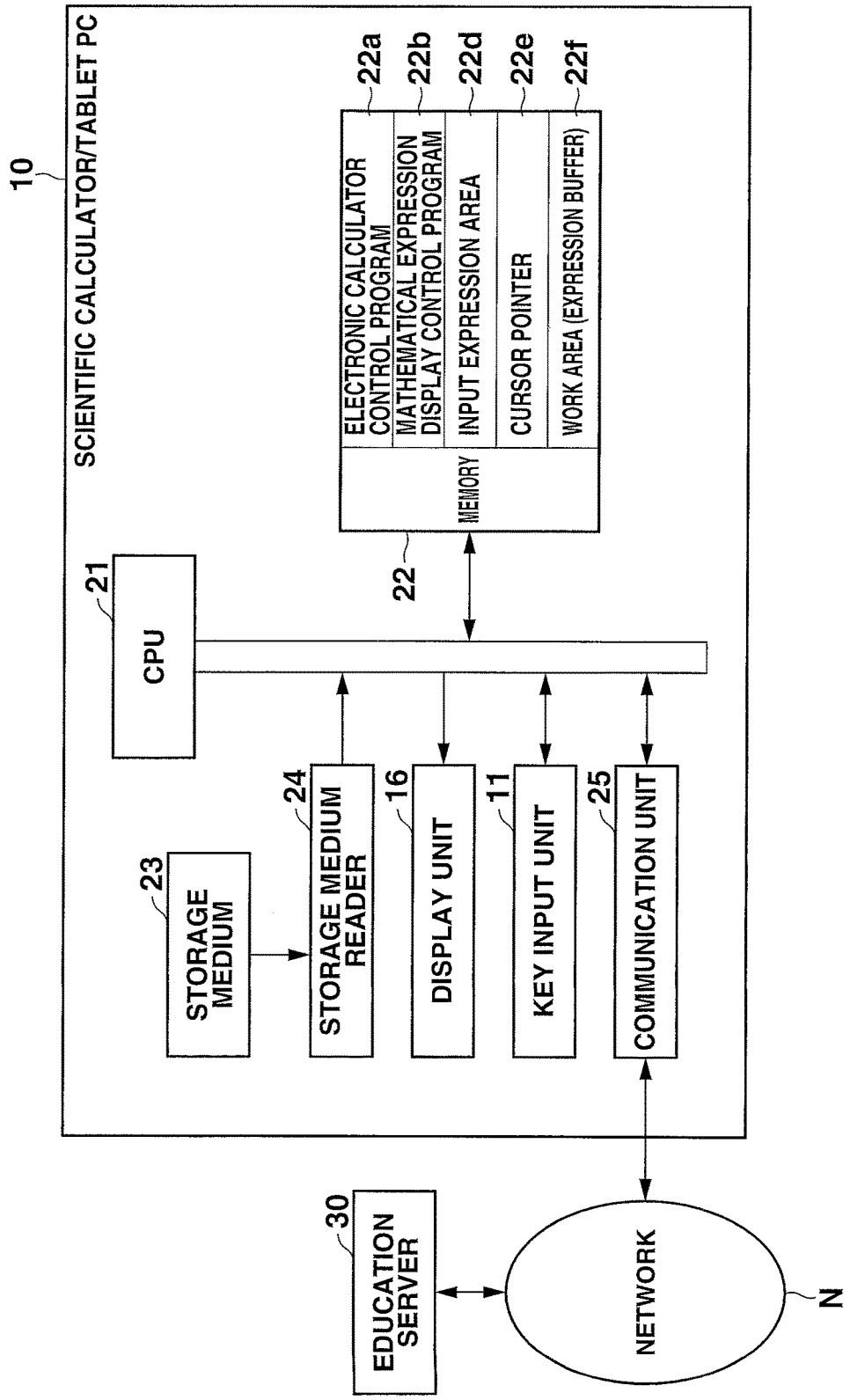
FIG. 2 is a block diagram illustrating a configuration of an electronic circuit of the scientific calculator in the present embodiment.

FIG. 2 is a block diagram illustrating a configuration of an electronic circuit of the scientific calculator 10.

The electronic circuit of the scientific calculator 10 includes a CPU 21 which is a computer.

The CPU 21 controls operations of respective circuit components in accordance with an electronic calculator control program 22a and a mathematical expression display control program 22b, which are prestored in a memory 22, or are read in the memory 22 via a storage medium reader 24 from an external storage medium 23 such as a memory card, or are downloaded in the memory 22 via a communication unit 25 from a Web server (in this example, an education server) 30 on a communication network N. The CPU 21 executes various arithmetic processes corresponding to key input signals from the key input unit 11.

In addition to the electronic calculator control program 22*a* and mathematical expression display control program 22*b* being stored in the memory 22, an input expression area 22*d*, a cursor pointer memory 22*e* and a work area (expression buffer) 22*f* are secured in the memory 22.

Data of key codes, which were key-input by the key input unit 11, is successively input to the input expression area 22*d*, and the data of a mathematical expression, which is thus composed, is stored. For example, in the case of a numeral key, a code indicative of a numeral is stored. In the case of a function key, such as "sin", a code indicative of the function of the function key is stored as one element. In the case of an arithmetic sign key, such as [+], [−], [×] or [÷], a code indicative of an arithmetic sign thereof is stored as one element.

In the cursor pointer memory 22*e*, pointer data indicative of the position of the cursor Cu, which is moved and displayed by the cursor key 15, is stored with respect to an object that is the data of the mathematical expression stored in the input expression area 22*d* and displayed on the display unit 16. It can be determined at which position of the mathematical expression the cursor Cu exits, based on the data of the mathematical expression and the position of the cursor Cu indicated by the pointer data of the cursor pointer memory 22*e*.

In the work area (expression buffer) 22*f*, various data, which is input/output to/from the CPU 21 in accordance with the electronic calculator control program 22*a* and mathematical expression display control program 22*b*, is temporarily stored when necessary. For example, when the integral key 13*a* was input, a numerical expression, where the pointer at the position of the cursor Cu, which was stored in the cursor pointer memory 22*e*, exits, is read out and temporarily stored in the work area (expression buffer) 22*f*, with respect to the object that is the data of the mathematical expression stored in the input expression area 22*d*.

In the scientific calculator 10 with the above-described structure, the CPU 21 controls the operations of the respective circuit components in accordance with instructions described in the electronic calculator control program 22*a* and mathematical expression display control program 22*b*, and the software and hardware cooperate to realize a mathematical expression display control function which is suited to display of conversion to an inverse number of a mathematical expression, which will be described in the operational description below.

Figure 3:
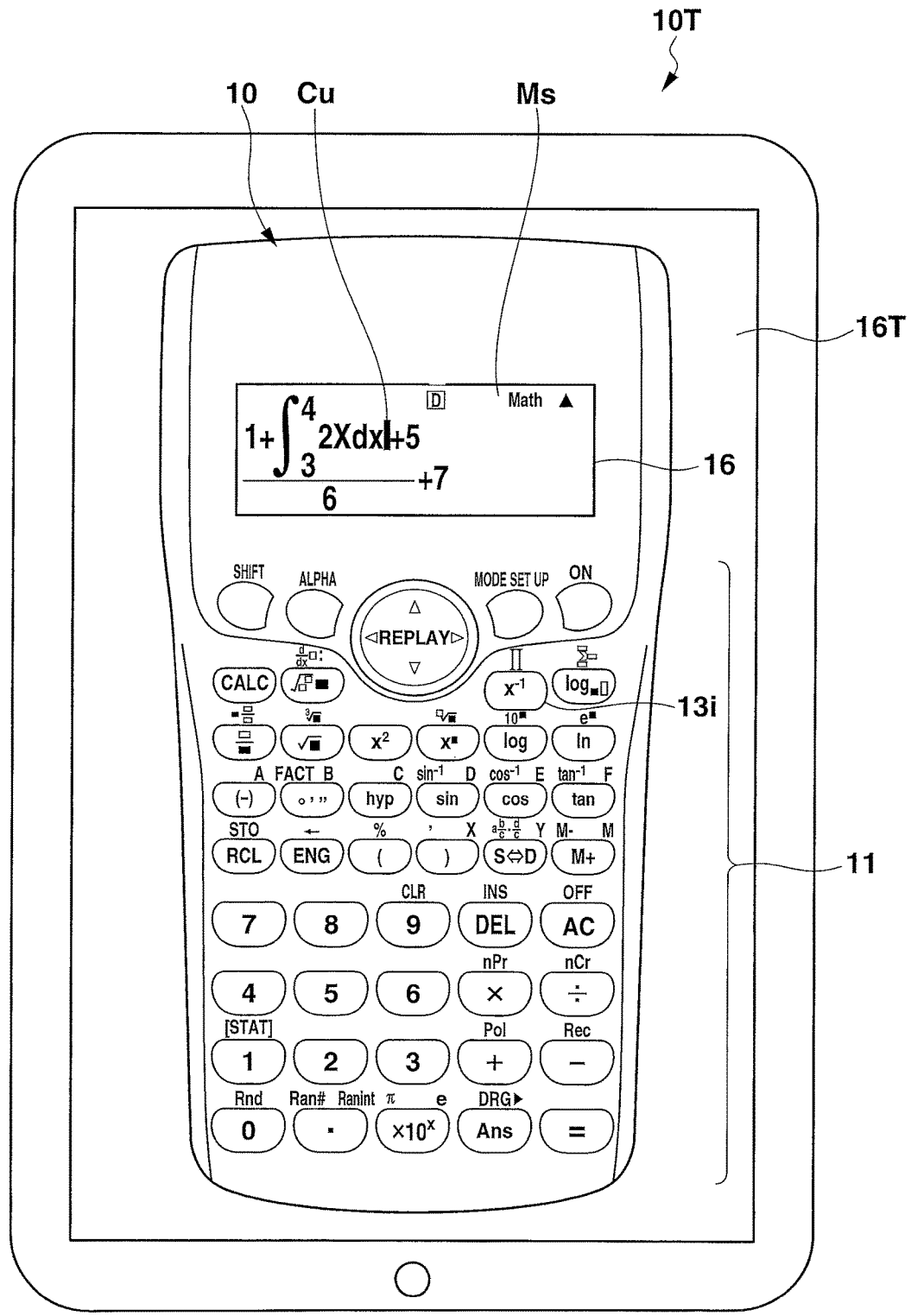
FIG. 3 is a front view illustrating an external appearance structure of a tablet PC according to another embodiment in the present embodiment.

In the meantime, although the embodiment of the mathematical expression display control device is described with respect to the case in which the mathematical expression display control device was realized by the scientific calculator 10, the mathematical expression display control device may be realized by a tablet PC 10T, as illustrated in FIG. 3. FIG. 3 is a front view illustrating an external appearance structure of the tablet PC 10T according to another embodiment of the mathematical expression display control device of the present invention.

The tablet PC 10T can realize the same functions as the scientific calculator 10 by the execution of an application program of a scientific calculator emulator in which the electronic calculator control program 22*a* and mathematical expression display control program 22*b* are assembled. For example, as illustrated in FIG. 3, the tablet PC 10T can be realized by a user performing a touch operation on a touch panel-type color display unit 16T, thereby executing input and display operations corresponding to the respective programs.

Next, a mathematical expression display control function of the scientific calculator 10 is described.

Figure 4:
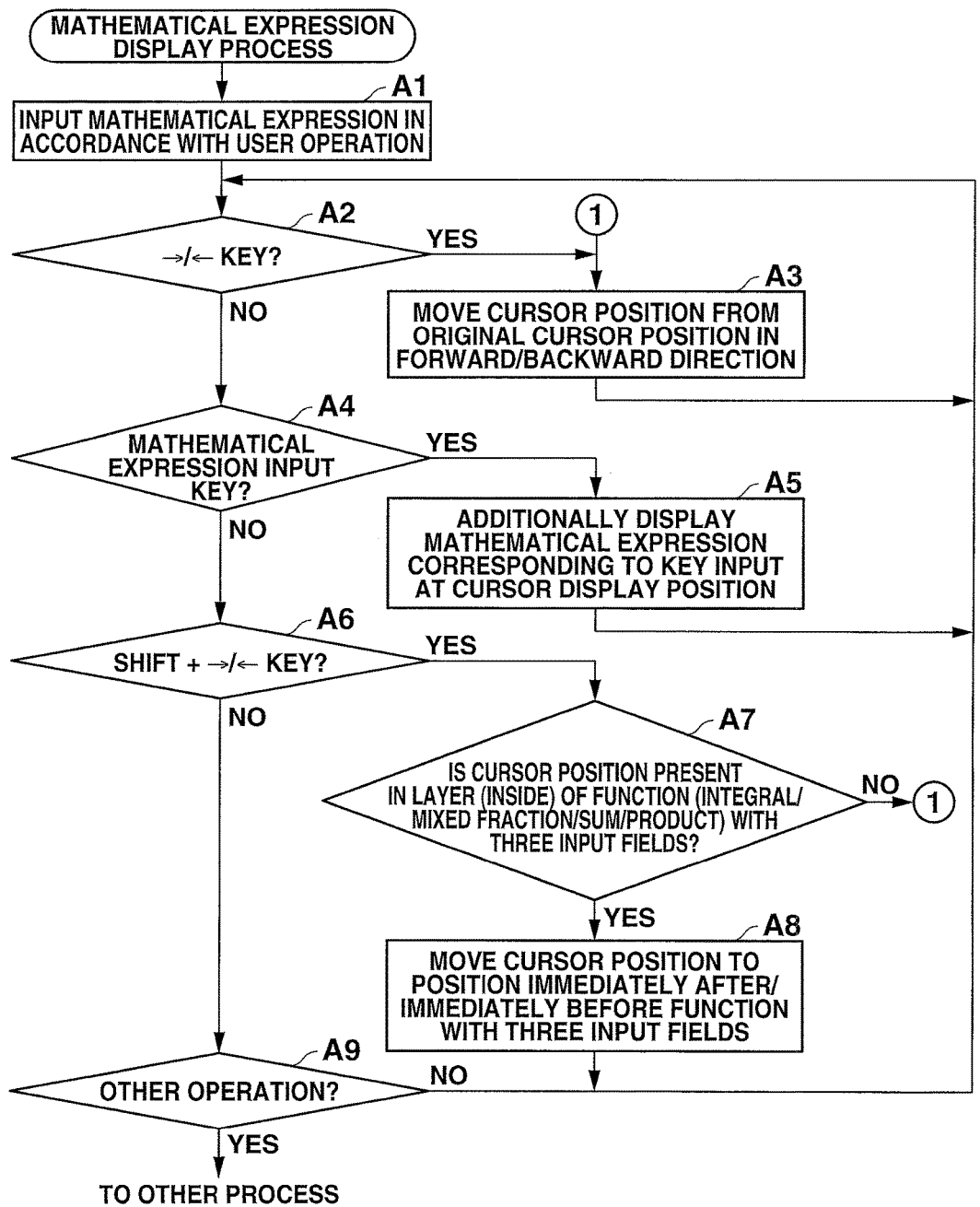
FIG. 4 is a flowchart illustrating a mathematical expression display process of the scientific calculator in the present embodiment.

FIG. 4 is a flowchart illustrating a mathematical expression display process of the scientific calculator 10 in the present embodiment.

The mathematical expression display process is a process of inputting, changing or adding a mathematical expression in accordance with a key operation by the user, the process being capable of designating, by the cursor, a position of an object of an input, change or addition during the display of the mathematical expression. The scientific calculator 10 of this embodiment provides a function which can easily move the cursor to an arbitrary position, even when a mathematical expression of a complex form, for instance, a mathematical expression including a function of a special arithmetic operation such as integration, is displayed in a mode of mathematically natural display.

To begin with, it is assumed that a mathematical expression is input to the scientific calculator 10 in accordance with a user operation (step A1). A description is now given of, by way of example, the case in which a mathematical expression of integration, which is a special arithmetic operation, is input.

If a key code corresponding to a key, which was input in accordance with a user operation of the key input unit 11, is read in the input expression area 22*d*, the CPU 21 determines, based on the key code, on which key the operation was executed. If the operation was executed on the integral key 13*a*, the CPU 21 starts an integral function, and causes the display unit 16 to display a screen for inputting a numerical expression including an integral sign. The integral function is one of input field-equipped functions (numerical expression creation functions) which can create a mathematical expression by displaying a screen for numerical expression input, on which an input field or input fields are provided at one or plural input positions of a numerical expression, and inputting numerical expression constituents (numerical values or signs) to respective input fields. Plural input positions are located at nonconsecutive positions, and are provided at different row positions in usual cases.

Figure 5:
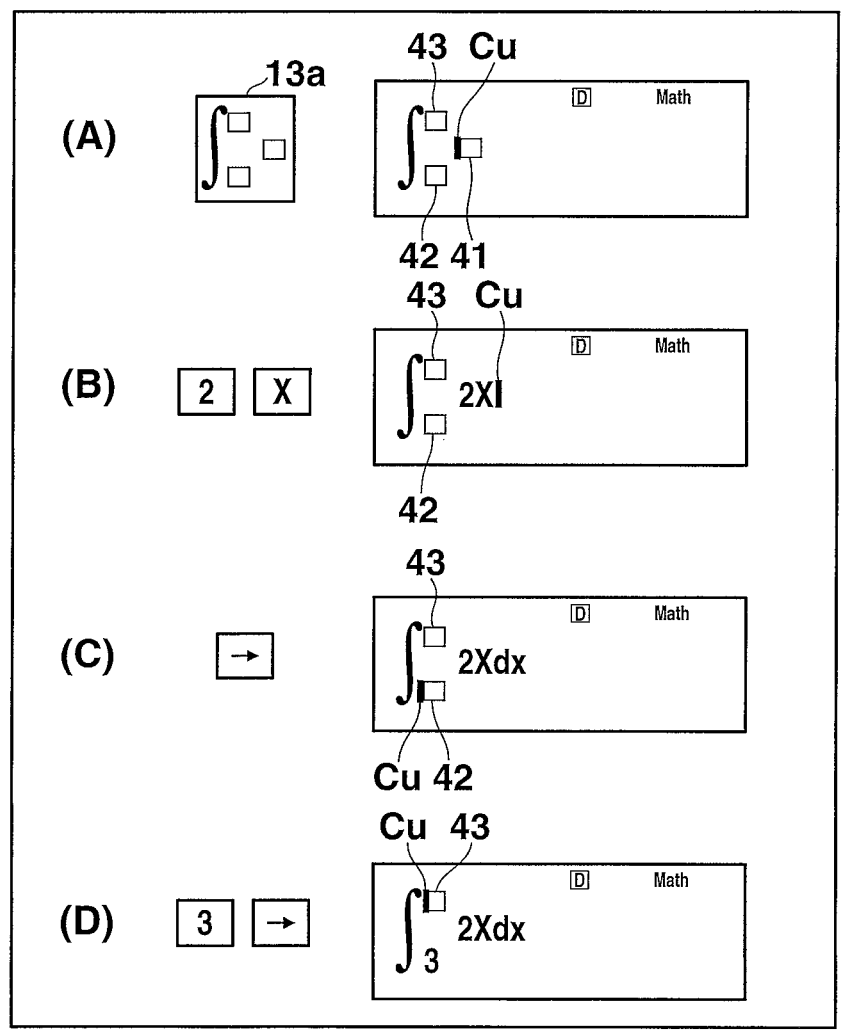
FIG. 5 is a view illustrating an example of a screen which is displayed when an integral function in the present embodiment was started.

Parts (A) to (D) of FIG. 5 illustrate examples of the screen which is displayed when the integral function is started.

As illustrated in part (A) of FIG. 5, in accordance with an operation of the integral key 13*a* which is an input field-equipped function with three input fields, the CPU 21 executes display of an integral sign, and three input fields 41, 42 and 43 at input positions corresponding to a numerical expression part, an infimum part and a supremum part. In addition, in the initial state, the CPU 21 displays the cursor Cu in front of the input field 41 corresponding to the numerical expression part. In short, the initial state is a state of an input to the numerical expression part.

In this case, if a character (a numerical expression constituent (e.g. a numeral, a variable, or an arithmetic sign), which represents a mathematical expression, is input by an operation on the numerical value/arithmetic sign key group 12 or the scientific function key group 13, the CPU 21 causes the character to be displayed at the position of the input field 41 of the numerical expression part. For example, as illustrated in part (B) of FIG. 5, if "2" and "X" are input by key operations, "2X" is displayed at the position of the input field 41, and the cursor Cu is moved immediately after "2X".

Next, if a movement of the cursor Cu to the right direction "→" is instructed by an operation on the cursor key 15, the CPU 21 moves, in accordance with the mathematical rule, the cursor Cu to the position of the input field 42 corresponding to the infimum part which is the next element and the next input object, as illustrated in part (C) of FIG. 5.

In this case, if a character (a numerical expression constituent), which represents an infimum, is input by an operation on the numerical value/arithmetic sign key group 12 or the scientific function key group 13, the CPU 21 causes the character to be displayed at the position of the input field 42 corresponding to the infimum. For example, as illustrated in part (D) of FIG. 5, if "3" is input by a key operation, "3" is displayed at the position of the input field 42, and the cursor Cu is moved immediately after "3". Next, if a movement of the cursor Cu to the right direction "→" is instructed by an operation on the cursor key 15, the CPU 21 moves, in accordance with the mathematical rule, the cursor Cu to the position of the input field 43 corresponding to the supremum part which is the next element and the next input object, as illustrated in part (D) of FIG. 5. Thereby, in the same manner as described above, if a character (a numerical expression constituent) is input by an operation on the numerical value/arithmetic sign key group 12 or the scientific function key group 13, the CPU 21 causes the character to be displayed at the position of the input field 43 corresponding to the supremum.

In this manner, the integral function is started by the operation of the integral key 13a, and the mathematical expression including the integral sign can be input by the integral function. In the meantime, by moving the position of the cursor Cu by the operation of the cursor key 15 to the outside of the numerical expression part created by the integral function, it is possible to additionally input and create a numerical expression which does not require normal 2D display, or a numerical expression using some other mathematical expression input function.

In the above description, the example in which the mathematical expression including the integral sign is created by the integral function has been described. Similarly, in accordance with the operation of the product key 13b, summation key 13c or fraction key (mixed fraction key) 13d, the corresponding product function, summation function or fraction (or mixed fraction) function can be started, and a mathematical expression can be displayed on the display unit 16 in the mathematically natural display mode by inputting the 2D function mathematical expression by using each function. Like the integral function, these functions are included in the input field-equipped functions (numerical expression creation functions).

In each of the functions, in accordance with a 2D mathematical expression of each function, like the above-described integral, input fields can be provided at a plurality of input positions, and characters (numerical expression constituents) can be input by operations on the numerical value/arithmetic sign key group 12 and scientific function key group 13.

For example, when the product function was started by the product key 13b, the CPU 21 displays a product sign "Π" and three input fields, and inputs numerical expression constituents in the respective input fields. Similarly, when the summation function was started by the summation key 13c, the CPU 21 displays a summation function "Σ" and three input fields, and inputs numerical expression constituents in the respective input fields. Incidentally, in the summation function, not only the three input fields corresponding to the numerical expression part, infimum part and supremum part are provided, but also the infimum part may be divided into two input fields corresponding to a numerical value and a variable (four input fields in total).

In addition, when the mixed fraction function was started by the mixed fraction key 13d (combined with [SHIFT] key), the CPU 21 displays input fields at input positions corresponding to an integer part, a numerator and a denominator, and inputs numerical expression constituents to the input fields in the order of the integer part, numerator and denominator.

In the meantime, in the above description, the number of input fields, which are displayed by each of the functions, is three (or four). However, depending on the mode in which a functional expression is input, it is possible to set the number of input fields to be two or five or more. For example, by providing a function which enables a batchwise input by combining a plurality of functional expressions, that number of input fields, which corresponds to the functional expressions corresponding to this function, are provided.

Next, a description is given of an operation on a mathematical expression which was input in accordance with a user operation.

In the state in which a numerical expression is displayed on the display unit 16, if a key of the right direction "→" or left direction "←" of the cursor key 15 was operated (step A2, Yes), the CPU 21 moves the cursor Cu by one element in a forward direction or a backward direction corresponding to the key operation, from the current position of the cursor Cu in the numerical expression (step A3). The forward direction or backward direction corresponding to the key operation is a direction according to the mathematical rule. For example, in the numerical expression created by the input field-equipped function such as the above-described integral, there is a case in which the cursor Cu is moved in the left direction in accordance with the key operation of the right direction "→". In addition, as regards the operation of the cursor key 15 alone, each time the cursor key 15 is once operated, the CPU 21 moves the cursor Cu in units of one element that is a constituent of the numerical expression. Specifically, the CPU 21 moves the cursor Cu by one numeral, symbol or sign, which is a constituent of the numerical expression. Incidentally, in the case of "sin(", "cos(", or "ln(" (common logarithm), the cursor is moved by treating one function as one element.

In addition, if any one of, or a plurality of, scientific functions including input field-equipped functions, other functions and characters were input by the user operation as one or plural elements of a numerical expression (step A4, Yes), the CPU 21 additionally inputs the numerical expression, which was instructed by the key input, to the current display position of the cursor Cu (step A5). Specifically, a general numerical expression, other than the 2D function, can be input by operations on the scientific function key group 13 and numerical value/arithmetic sigh key group 12, aside from the input of the numerical expression by the input field-equipped function such as the above-described integral function.

Furthermore, in the scientific calculator 10 in the present embodiment, a control, other than the movement control of the cursor Cu corresponding to the operation of the cursor key 15 in steps A2 and A3, can be executed by a preset predetermined key operation. Specifically, in the key operation of the cursor key 15 alone, the cursor Cu is moved in units of one element that is a constituent of the mathematical expression. In addition, in accordance with a specific user operation, the cursor Cu can be moved (large movement) over a plurality of elements which are constituents of the mathematical expression.

For example, it is assumed that, when the cursor Cu is in a numerical expression created by an input field-equipped function, the cursor Cu is moved to the outside of the numerical expression created by the input field-equipped function, in accordance with a preset predetermined key operation. In this case, it is assumed that the large movement of the cursor Cu can be instructed by a combined operation of the [SHIFT] key 14*a* and cursor key 15. By the combined operation of the [SHIFT] key 14*a* and cursor key 15, the direction of movement of the cursor Cu and the specific operation can be instructed at the same time.

In the meantime, as the preset predetermined key operation for largely moving the cursor Cu, use may be made of a key operation on a dedicated key (large cursor key), a double-click operation of the existing cursor key 15, or an operation in which a key, other than the [SHIFT] key 14*a*, and the cursor key 15 are combined.

If a key operation was executed by a combination of operations of the [SHIFT] key 14*a* and the right direction "→" of the cursor key 15 or a combination of operations of the [SHIFT] key 14*a* and the left direction "←" of the cursor key 15 (step A6, Yes), the CPU 21 determines whether the current position of the cursor Cu is in the inside of a numerical expression (in the inside of the layer of the input field-equipped function) which was created by the function with plural input fields (in the present embodiment, the integral function, summation function, product function, or mixed fraction function, each having three input fields).

If the cursor Cu is not present in the inside of the numerical expression created by the function with plural input fields (in the present embodiment, the integral function, summation function, product function, or mixed fraction function, each having three input fields) (step A7, No), the CPU 21 moves the display position of the cursor Cu in units of one element that is a constituent of the numerical expression, like the case in which the cursor key 15 alone was operated (step A3). For example, when the combined operation of the [SHIFT] key 14*a* and the right direction "→" of the cursor key 15 was executed, the CPU 21 moves the cursor Cu in the forward direction by one element from the current position of the cursor Cu, like the case in which the key operation of the right direction "→" of the cursor key 15 was executed. Similarly, when the combined operation of the [SHIFT] key 14*a* and the left direction "←" of the cursor key 15 was executed, the CPU 21 moves the cursor Cu in the backward direction by one element, which is a constituent of the numerical expression, from the current position of the cursor Cu.

On the other hand, if the cursor Cu is present in the inside of the numerical expression created by the function with plural input fields (in the present embodiment, the integral function, summation function, product function, or mixed fraction function, each having three input fields) (step A7, Yes), the CPU 21 moves the cursor Cu to a position immediately after or immediately before the numerical expression created by the function with plural input fields (step A8). Specifically, when the combined operation of the [SHIFT] key 14*a* and the right direction "→" of the cursor key 15 was executed, the CPU 21 moves the cursor Cu to a position immediately after the numerical expression created by the function with plural input fields. When the combined operation of the [SHIFT] key 14*a* and the left direction "←" of the cursor key 15 was executed, the CPU 21 moves the cursor Cu to a position immediately before the numerical expression created by the function with plural input fields.

If some other key operation, which does not correspond to step A2, A4 or A6 (step A9, Yes), the CPU 21 executes another process corresponding to this key operation.

Next, concrete examples of the movement of the cursor Cu in the mathematical expression are described with reference to FIG. 6, FIG. 7 and FIG. 8.

Figure 6:
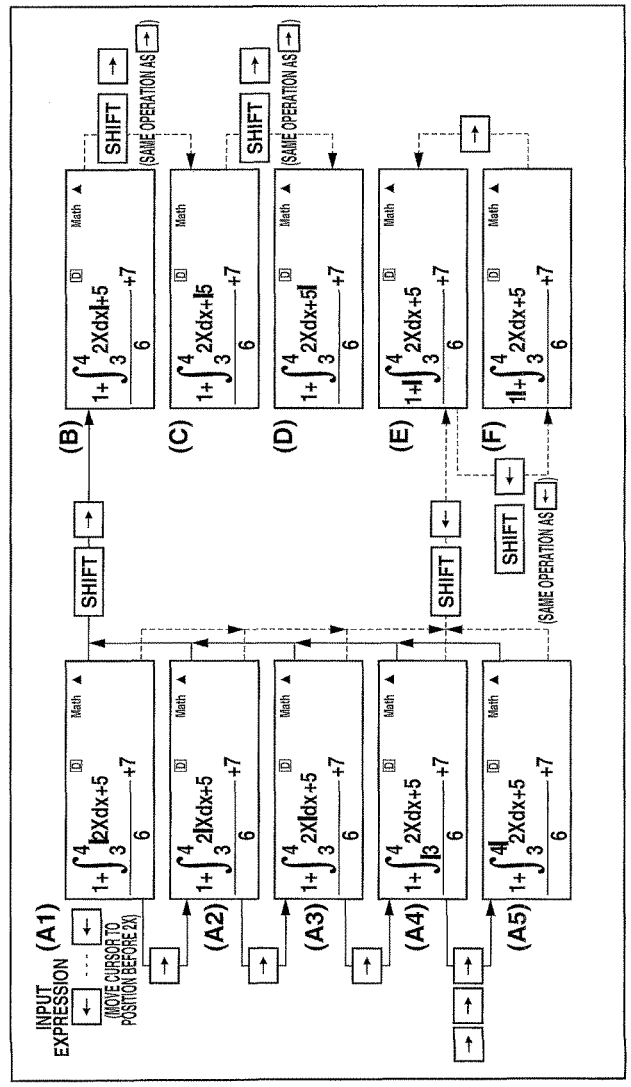
FIG. 6 is a view illustrating a concrete example of movement of a cursor within a mathematical expression in the present embodiment.

It is now assumed that a mathematical expression illustrated, for example, in part (A1) of FIG. 6, is input and displayed on the display unit 16. The mathematical expression illustrated in part (A1) of FIG. 6 is an example of a mathematical expression including an improper fraction part, which is an input field-equipped function with two input fields, and a numerical expression part which was input by the integral function that is an input field-equipped function with three input fields. Part (A1) of FIG. 6 illustrates a state in which the key operation of the left direction "←" of the cursor key 15 has been executed multiple times and thereby the cursor Cu has been moved to a position immediately before numeral "2" in the numerical expression created by the integral function.

In this case, if the operation of the right direction "→" of the cursor key 15 is executed, the CPU 21 moves the cursor Cu to a position after numeral "2" (i.e. by one element that is a constituent of the expression), as illustrated in part (A2) of FIG. 6. If the operation of the right direction "→" is further executed, the CPU 21 moves the cursor Cu to a position after symbol "X", as illustrated in part (A3) of FIG. 6. If the operation of the right direction "→" is further executed, the CPU 21 moves the cursor Cu to a position immediately before numeral "3" of the infimum part, according to the mathematical rule of integral, as illustrated in part (A4) of FIG. 6. Furthermore, if the operation of the right direction "→" is executed three times, the CPU 21 successively moves the cursor Cu to a position immediately after numeral "4" of the supremum part, as illustrated in part (A5) of FIG. 6.

In this manner, when the cursor Cu is present in the numerical expression created by the input field-equipped function, the cursor Cu can be moved in units of an element that is a constituent of the expression, in accordance with the operation of the cursor key 15.

When the cursor Cu is present in the numerical expression created by the integral function that is the input field-equipped function with three input fields, as illustrated in parts (A1) to (A5) of FIG. 6, if the combined operation of the [SHIFT] key 14*a* and right direction "→" of the cursor key 15, which instructs large movement of the cursor Cu, is executed, the CPU 21 moves the cursor Cu to the outside of the numerical expression created by the integral function, that is, to a position immediately after this numerical expression, as illustrated in part (B) of FIG. 6. Even when the cursor Cu is present at any position in the numerical expression created by the integral function, as illustrated in parts (A1) to (A5) of FIG. 6, the cursor Cu can easily be moved to the outside of the numerical expression created by the integral function in the direction of the cursor key by the single operation which instructs large movement.

When the cursor Cu is present outside the numerical expression created by the integral function, as illustrated in part (B) of FIG. 6, if the combined operation of the [SHIFT] key 14*a* and the right direction "→" of the cursor key 15, which instructs large movement of the cursor Cu, is executed, the CPU 21 moves the cursor Cu to a position immediately after sign "+" (i.e. by one constituent element of the numerical expression), as illustrated in part (C) of FIG. 6, like the case in which only the operation of the right direction "→" of the cursor key 15 is executed. Similarly, at the time of the state of part (C) of FIG. 6, if the combined operation of the [SHIFT] key 14a and the right direction "→" of the cursor key 15 is executed, the CPU 21 moves the cursor Cu to a position immediately after numeral "5" (i.e. by one constituent element of the numerical expression), as illustrated in part (D) of FIG. 6.

In addition, when the cursor Cu is present in the numerical expression created by the integral function, as illustrated in parts (A1) to (A5) of FIG. 6, if the combined operation of the [SHIFT] key 14a and the left direction "←" of the cursor key 15, which instructs large movement of the cursor Cu, is executed, the CPU 21 moves the cursor Cu to the outside of the numerical expression created by the integral function, that is, to a position immediately before this numerical expression, as illustrated in part (E) of FIG. 6. Like the case of the above-described large movement to the right direction, even when the cursor Cu is present at any position in the numerical expression created by the integral function, as illustrated in parts (A1) to (A5) of FIG. 6, the cursor Cu can easily be moved to the outside of the numerical expression created by the integral function by the single operation which instructs large movement.

When the cursor Cu is present outside the numerical expression created by the integral function, as illustrated in part (E) of FIG. 6, if the combined operation of the [SHIFT] key 14a and the left direction "←" of the cursor key 15, which instructs large movement of the cursor Cu, is executed, the CPU 21 moves the cursor Cu to a position immediately before sign "+" (i.e. by one constituent element of the numerical expression), as illustrated in part (F) of FIG. 6, like the case in which only the operation of the left direction "←" of the cursor key 15 is executed. At the time of the state illustrated in part (F) of FIG. 6, if the operation of only the right direction "→" of the cursor key 15 is executed, the CPU 21 moves the cursor Cu to the position immediately after sign "+" (i.e. by one element that is a constituent of the numerical expression), as illustrated in part (E) of FIG. 6.

Figure 7:
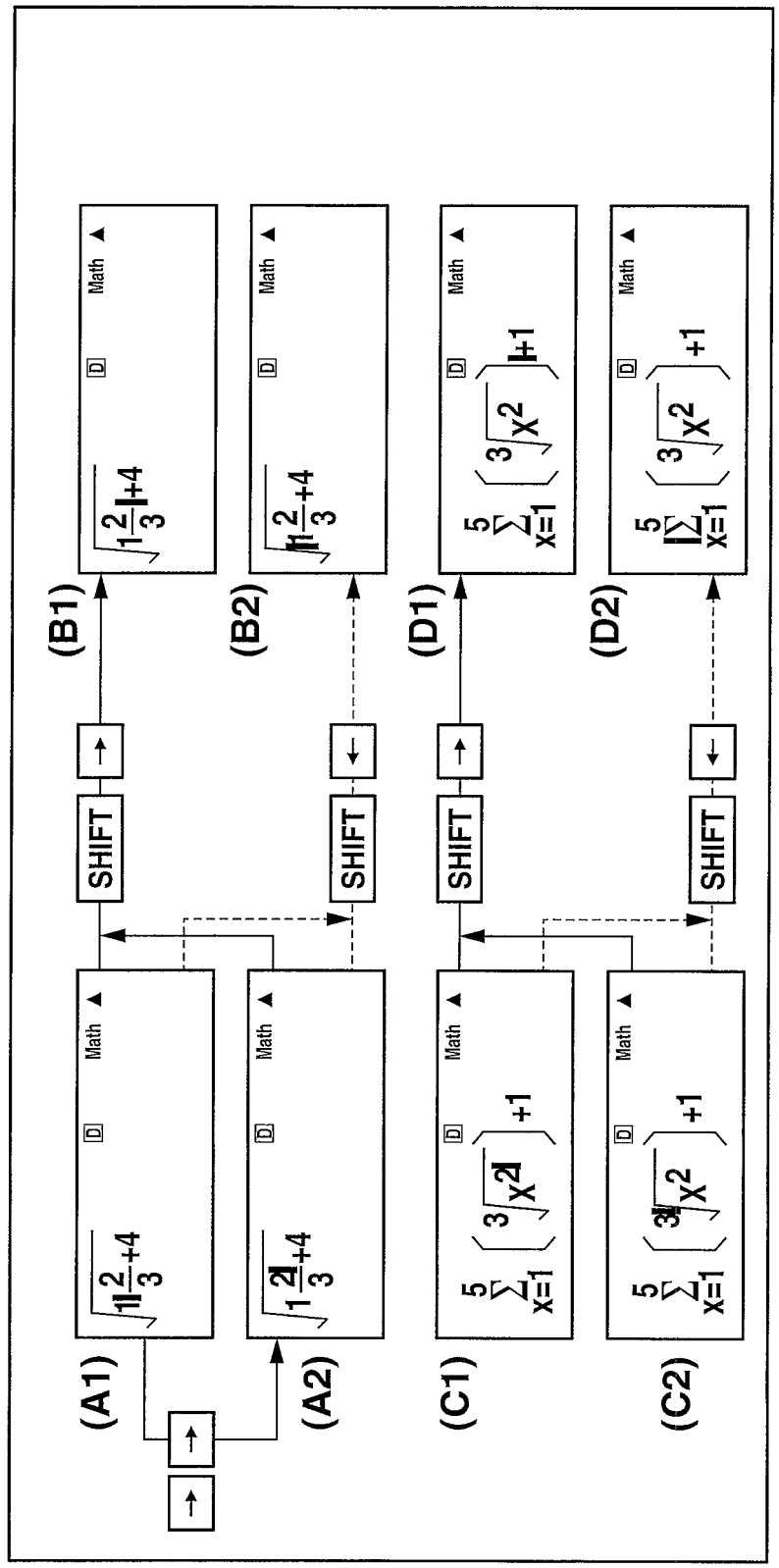
FIG. 7 is a view illustrating a concrete example of movement of a cursor within a mathematical expression in the present embodiment.

Next, it is assumed that a mathematical expression illustrated, for example, in part (A1) of FIG. 7, is input and displayed on the display unit 16. The mathematical expression illustrated in part (A1) of FIG. 7 is an example of a mathematical expression including, within a root sign, a numerical expression part which was input by the mixed fraction function that is an input field-equipped function with three input fields. Part (A1) of FIG. 7 illustrates a state in which the cursor Cu is displayed at a position immediately after an integer part (numeral "1") in the numerical expression created by the mixed fraction function.

In this case, if the operation of the right direction "→" of the cursor key 15 is executed twice, the CPU 21 moves the cursor Cu to a position after numeral "2" of the numerator of the mixed fraction (i.e. by two constituent elements of the numeral expression), as illustrated in part (A2) of FIG. 7. Specifically, when the cursor Cu is present in the numerical expression (mixed fraction) created by the input field-equipped function, the cursor Cu can be moved in units of an element that is a constituent of the numeral expression, in accordance with the operation of the cursor key 15. Incidentally, when the cursor Cu is present in the numerical expression created by the mixed fraction function, the cursor Cu is displayed in a small size with a short vertical dimension.

On the other hand, when the cursor Cu is present in the numerical expression created by the mixed fraction function that is the input field-equipped function with three input fields, as illustrated in parts (A1) and (A2) of FIG. 7, if the combined operation of the [SHIFT] key 14a and the right direction "→" of the cursor key 15, which instructs large movement of the cursor Cu, is executed, the CPU 21 moves the cursor Cu to the outside of the numerical expression created by the mixed fraction function, that is, to a position immediately after this numerical expression, as illustrated in part (B1) of FIG. 7. Even when the cursor Cu is present at any position in the numerical expression created by the mixed fraction function that is the input field-equipped function with three input fields, as illustrated in parts (A1) and (A2) of FIG. 7, the cursor Cu can easily be moved to the outside of the numerical expression, which was created by the mixed fraction function that is the input field-equipped function with three input fields, in the right direction "→" that is the cursor operation direction by the single operation which instructs large movement. Incidentally, when the cursor Cu is present outside the numerical expression created by the mixed fraction function, the cursor Cu is displayed in a large size with a long vertical dimension.

In addition, when the cursor Cu is present in the numerical expression created by the mixed fraction function that is the input field-equipped function with three input fields, as illustrated in parts (A1) and (A2) of FIG. 7, if the combined operation of the [SHIFT] key 14a and the left direction "←" of the cursor key 15, which instructs large movement of the cursor Cu, is executed, the CPU 21 moves the cursor Cu to the outside of the numerical expression created by the mixed fraction function, that is, to a position immediately before this numerical expression (i.e. immediately before numeral "1" of the integer part), as illustrated in part (B2) of FIG. 7. Like the case of the above-described large movement to the right direction, even when the cursor Cu is present at any position in the numerical expression created by the mixed fraction function, as illustrated in parts (A1) and (A2) of FIG. 7, the cursor Cu can easily be moved to the outside of the numerical expression created by the mixed fraction function (i.e. to the outside in the left direction that is the cursor operation direction) by the single operation which instructs large movement.

Next, it is assumed that a mathematical expression illustrated, for example, in part (C1) of FIG. 7, is input and displayed on the display unit 16. The mathematical expression illustrated in part (C1) of FIG. 7 is an example of a mathematical expression including a root part in a numerical expression which was input by the summation function that is an input field-equipped function with three input fields. Part (C1) of FIG. 7 illustrates a state in which the cursor Cu is displayed at a position immediately after numeral "2" which is indicative of an exponent of the root part in the numerical expression created by the summation function. Part (C2) of FIG. 7 illustrates a state in which the cursor Cu is displayed at a position immediately after numeral "3" which is indicative of a power root of the root part in the numerical expression created by the summation function.

When the cursor Cu is present in the numerical expression created by the summation function that is the input field-equipped function with three input fields, as illustrated in parts (C1) and (C2) of FIG. 7, if the combined operation of the [SHIFT] key 14a and the right direction "→" of the cursor key 15, which instructs large movement of the cursor Cu, is executed, the CPU 21 moves the cursor Cu to the outside of the numerical expression created by the summation function, that is, to a position immediately after this numerical expression (i.e. a position immediately before sign "+"), as illustrated in part (D1) of FIG. 7. Even when the cursor Cu is present at any position in the numerical expression created by the summation function, as illustrated in parts (C1) and (C2) of FIG. 7, the cursor Cu can easily be moved to the outside of the numerical expression, which was created by the summation function, in the right direction "→" that is the cursor operation direction by the single operation which instructs large movement.

Similarly, when the cursor Cu is present in the numerical expression created by the summation function that is the input field-equipped function with three input fields, as illustrated in parts (C1) and (C2) of FIG. 7, if the combined operation of the [SHIFT] key 14a and the left direction "←" of the cursor key 15, which instructs large movement of the cursor Cu, is executed, the CPU 21 moves the cursor Cu to the outside of the numerical expression created by the summation function, that is, to a position immediately before this numerical expression (i.e. a position immediately before the summation sign), as illustrated in part (D2) of FIG. 7. Like the case of the above-described large movement to the right direction, even when the cursor Cu is present at any position in the numerical expression created by the summation function, as illustrated in parts (C1) and (C2) of FIG. 7, the cursor Cu can easily be moved to the outside of the numerical expression, which was created by the summation function, in the right direction "→" that is the cursor operation direction by the single operation which instructs large movement.

Figure 8:
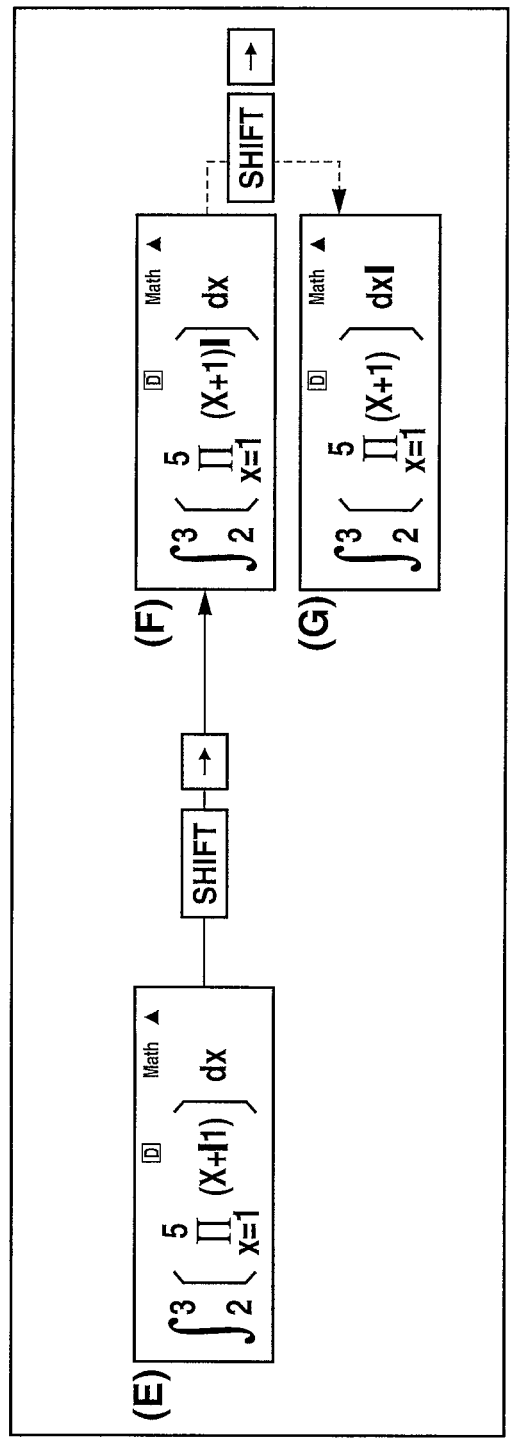
FIG. 8 is a view illustrating a concrete example of movement of a cursor within a mathematical expression in the present embodiment.

Next, it is assumed that a mathematical expression illustrated, for example, in part (E) of FIG. 8, is input and displayed on the display unit 16. The mathematical expression illustrated in part (E) of FIG. 8 is an example of a mathematical expression in which a numerical expression that was input by a product function is included in a numerical expression that was input by the integral function which is the input field-equipped function with three input fields. Part (E) of FIG. 8 illustrates a state in which the cursor Cu is displayed at a position immediately before numeral "1" of the numerical expression part in the numerical expression created by the product function.

When the cursor Cu is present in the numerical expression created by the product function that is the input field-equipped function with three input fields, as illustrated in part (E) of FIG. 8, if the combined operation of the [SHIFT] key 14a and the right direction "→" of the cursor key 15, which instructs large movement of the cursor Cu, is executed, the CPU 21 moves the cursor Cu to the outside of the numerical expression created by the product function in the right direction "→" that is the cursor operation direction, as illustrated in part (F) of FIG. 8. If the same operation is further executed, the CPU 21 moves the cursor Cu to the outside of the numerical expression created by the integral function, as illustrated in part (G) of FIG. 8.

In this manner, even when the cursor Cu is present in the numerical expression in which a plurality of input field-equipped functions are combined, the cursor Cu can easily be moved successively to the outside of the numerical expression created by each input field-equipped function (product function, integral function) by the operation which instructs large movement.

In this manner, even when the cursor Cu is present in the numerical expression created by the input field-equipped function, the cursor Cu can easily be moved to the outside of the numerical expression by the predetermined key operation for largely moving the cursor Cu. Accordingly, even in the case of additionally creating a numerical expression, it is possible to move the cursor Cu, by a single operation, to a position immediately before or immediately after the numerical expression which was created by the input field-equipped function, and to transition to a key operation of the numerical expression that is to be added. Thus, the number of times of a key operation can greatly be reduced, and the cursor Cu can easily be moved to an arbitrary position in the mathematical expression which is displayed by mathematically natural display.

Besides, in the case of the combination of the [SHIFT] key 14a and the right direction "→" of the cursor key 15, the cursor Cu is moved to the position immediately after the numerical expression. In the case of the combination of the [SHIFT] key 14a and the left direction "←" of the cursor key 15, the cursor Cu is moved to the position immediately before the numerical expression. Specifically, in the numerical expression created by the input field-equipped function, there is a case in which the direction that is instructed by the operation of the cursor key 15 alone is different from the direction of movement of the cursor Cu in the numerical expression. However, in the operation of large movement, the direction that is instructed by the operation agrees with the direction of movement of the cursor Cu. Therefore, the control of the cursor Cu, which the user can easily recognize, is possible, and the operation does not become time-consuming.

Next, a modification of the scientific calculator 10 in the present embodiment is described.

Figure 9:
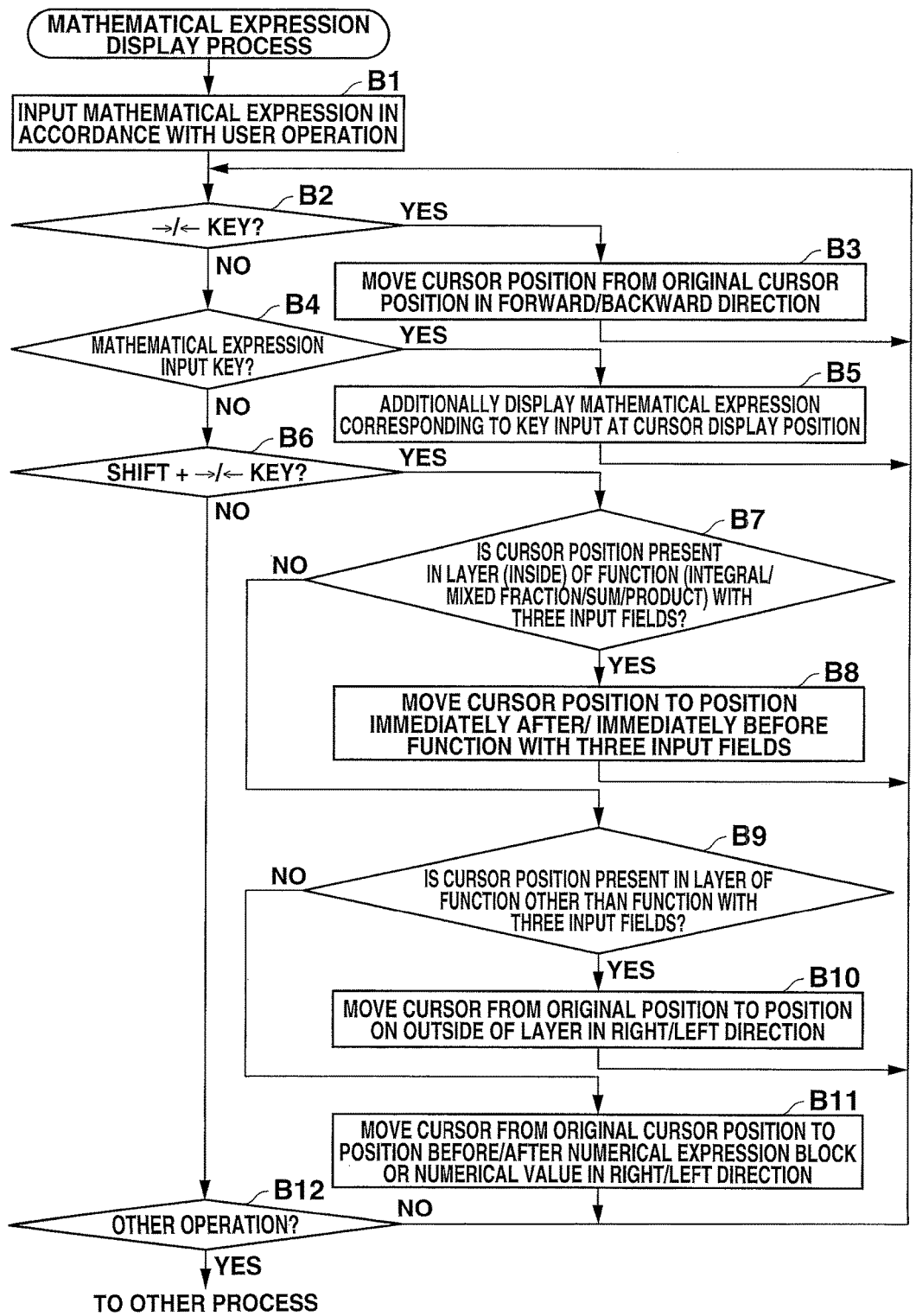
FIG. 9 is a flowchart illustrating a mathematical expression display process (modification) of the scientific calculator in the present embodiment.

FIG. 9 is a flowchart illustrating a mathematical expression display process (modification) of the scientific calculator 10 in the present embodiment.

Incidentally, a detailed description of steps B1 to B8, and B12 illustrated in FIG. 9 is omitted, assuming that the same process as in steps A1 to A9 of the flowchart of FIG. 4 is executed in steps B1 to B8, and B12. In the modification of the mathematical expression display process illustrated in FIG. 9, the same control of movement of the cursor Cu as described above is executed not only when the cursor Cu is present in a numerical expression created by an input field-equipped function, but also when the cursor Cu is present within a "certain expression block" having a mathematical meaning.

The "certain expression block" having a mathematical meaning is, for instance, a numerical expression created by a numerical expression creation function other than input field-equipped functions, or a term (hereinafter, also referred to as "numerical expression block") divided by signs of four basic operations of arithmetic (four-rule signs), [+], [−], [×] and [÷].

If a key operation is executed by the combination of operations of the [SHIFT] key 14a and the right direction "→" of the cursor key 15, or by the combination of operations of the [SHIFT] key 14a and the left direction "←" of the cursor key 15 (step B6, Yes), the CPU 21 determines whether the current position of the cursor Cu is in the inside of the numerical expression created by the input field-equipped function (in the layer of the input field-equipped function). If the cursor Cu is not present in the inside of the numerical expression created by the input field-equipped function (step B7, No), the CPU 21 determines whether the current position of the cursor Cu is present in the inside of a numerical expression created by a function other than the input field-equipped function (in a layer of some other function).

If the cursor Cu is present in a numerical expression created by a function other than the input field-equipped function (step B9, Yes), the CPU 21 moves the cursor Cu from the original position of the cursor Cu in the right direction or left direction to the outside of the numerical expression in which the cursor Cu is included (to the outside of the layer) (step B10). Specifically, in the case of the combination of operations of the [SHIFT] key 14a and the right direction "→" of the cursor key 15, the cursor Cu is moved to the position immediately after this numerical expression. In the case of the combination of operations of the [SHIFT] key 14a and the left direction "←" of the cursor key 15, the cursor Cu is moved to the position immediately before this numerical expression.

Further, if the cursor Cu is present in a part other than the numerical expression created by the function other than the input field-equipped function (step B9, No), the CPU 21 moves the cursor Cu from the original position of the cursor Cu to a position before/after a part (numerical value) excluding a sign of a numerical expression block or a term in the right direction or left direction corresponding to the operation of the cursor 15 (step B11).

For example, in the case where there is a numerical expression, "$3x^2-7x^2+2x+(-23)$", if the cursor Cu is present immediately after "x" of the second term "$7x^2$" and if large movement is instructed by the combined operation of the [SHIFT] key 14a and the left direction "→" of the cursor key 15, the CPU 21 moves the cursor Cu to a position immediately before "7" of the second term "$7x^2$".

In addition, if similar large movement is instructed when the cursor Cu is present immediately before the third term "2x" of the third term, the CPU 21 moves the cursor Cu to a position immediately after the second term "$7x^2$".

In this manner, even when the cursor Cu is present at a position outside the numerical expression created by the numerical expression creation function such as the input field-equipped function, the display position of the cursor Cu can be controlled like the case in which the cursor Cu is present in the numerical expression created by the above-described numerical expression creation function.

Figure 10:
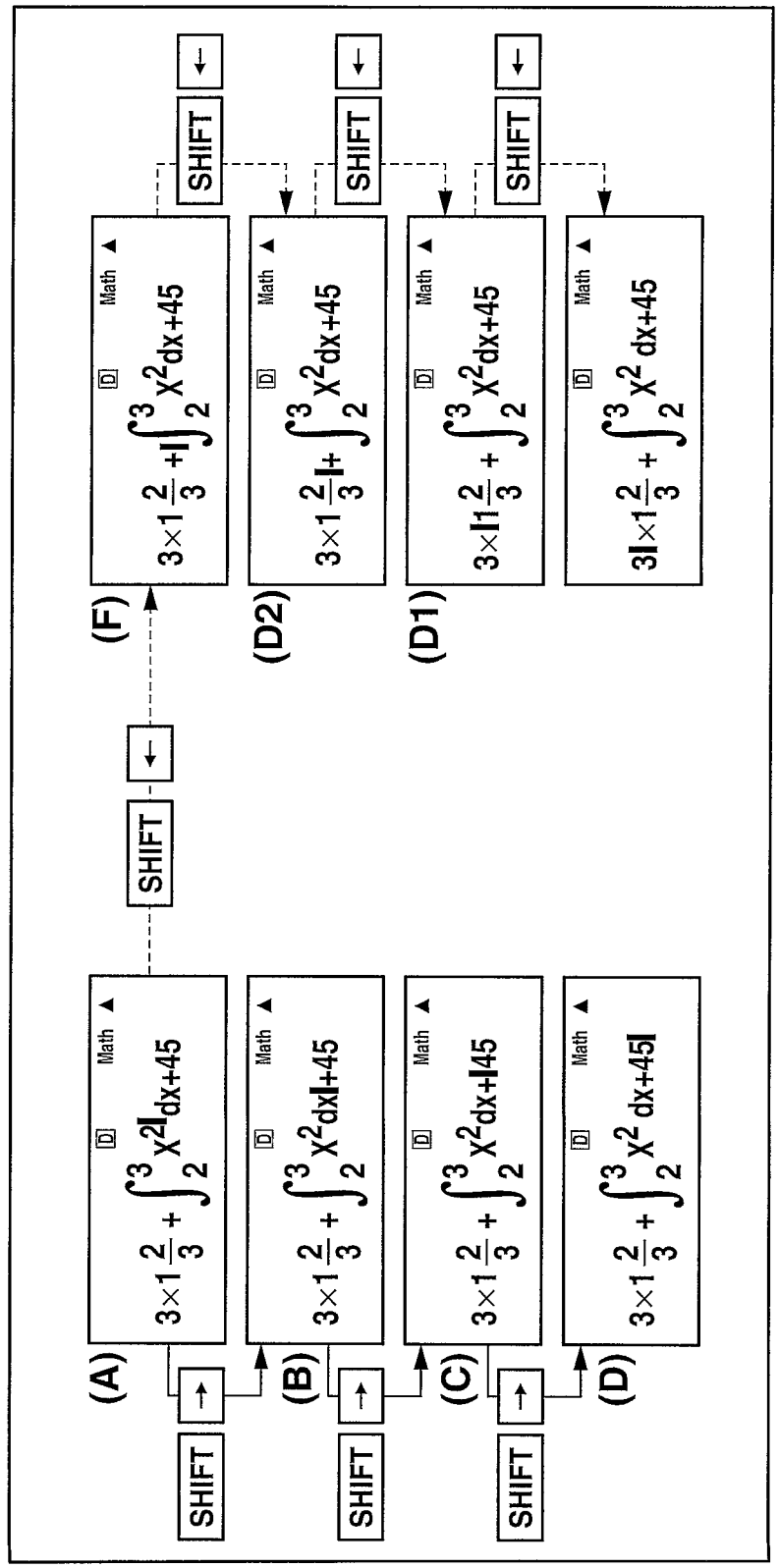
FIG. 10 is a view illustrating a concrete example of movement of a cursor within a mathematical expression in a modification in the present embodiment.
Figure 11:
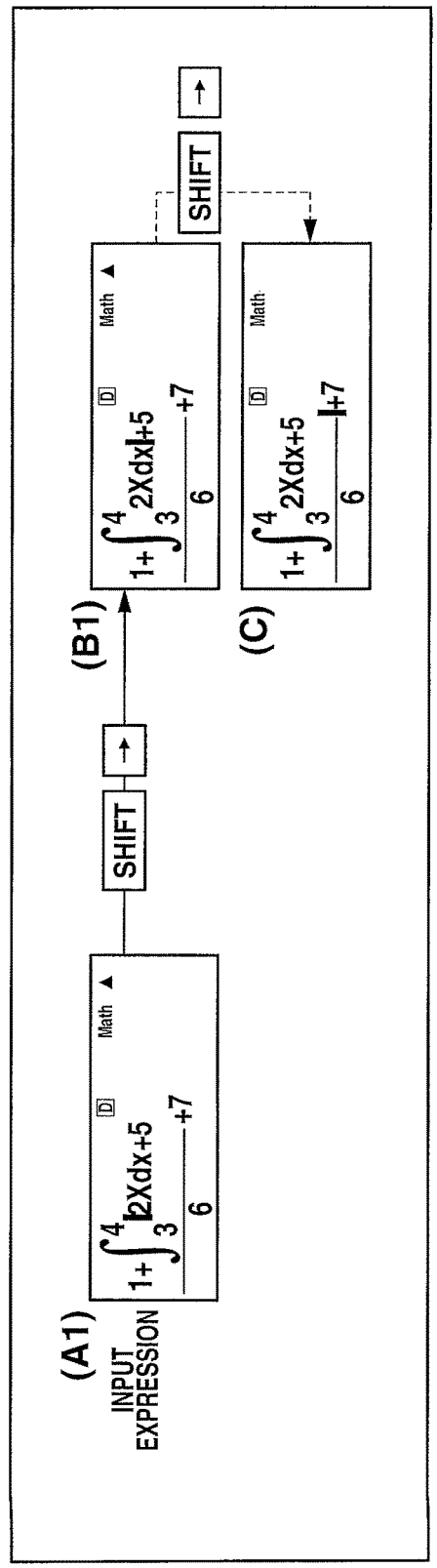
FIG. 11 is a view illustrating a concrete example of movement of a cursor within a mathematical expression in a modification in the present embodiment.

Next, referring to FIG. 10 and FIG. 11, a description is given of concrete examples of movement of the cursor Cu within mathematical expressions in the modification.

It is now assumed that a mathematical expression illustrated, for example, in part (A) of FIG. 10, is input and displayed on the display unit 16. The mathematical expression illustrated in part (A) of FIG. 10 is an example of a mathematical expression including numerical expression parts which were input by the integral function and the mixed fraction function, and numerical expression blocks which do not require 2D display. Part (A) of FIG. 10 illustrates a state in which the cursor Cu is present in the numerical expression part created by the integral function.

In this case, by the key operation of the right direction "→" of the cursor key 15 being executed, the cursor Cu is moved to the outside of the numerical expression created by the integral function, that is, to a position immediately after this numerical expression, as illustrated in part (B) of FIG. 10.

If the same operation is further executed, the CPU 21 moves the cursor Cu to a position before numerical value "45" in the right direction, since the cursor Cu is not present in the numerical expressions created by the input field-equipped function and other function. Furthermore, if the same operation is executed, the CPU 21 moves the cursor Cu to a position after numerical value "45" in the right direction, since the cursor Cu is not present in the numerical expressions created by the input field-equipped function and other function.

When the cursor Cu is present in the numerical expression created by the integral function, as illustrated in part (A) of FIG. 10, if the combined operation of the [SHIFT] key 14a and the left direction "←" of the cursor key 15, which instructs large movement of the cursor Cu, is executed, the CPU 21 moves the cursor Cu to the outside of the numerical expression created by the integral function (i.e. to a position immediately before the numerical expression), as illustrated in part (F) of FIG. 10. If the same operation is further executed, the CPU 21 moves the cursor Cu to a position immediately after the term (numerical expression created by the mixed fraction function) in the left direction of the cursor Cu, as illustrated in part (D2) of FIG. 10. Furthermore, if the same operation is executed, the CPU 21 moves the cursor Cu to a position immediately before the numerical expression created by the mixed fraction function, as illustrated in part (D1) of FIG. 10. If the same operation is executed once again, the CPU 21 moves the cursor Cu to a position immediately after the term "3" in the left direction (cursor operation direction) of the cursor Cu.

In this manner, by the same operation which instructs large movement of the cursor Cu, the cursor Cu can be similarly moved for the numerical expressions created by the numerical expression creation function and for other numerical expression parts (terms), without the cursor Cu being moved in units of one numerical expression constituent element which is a constituent of the numerical expression.

As illustrated in part (A1) of FIG. 11, in a mathematical expression created by combining the mixed fraction function and integral function, if the combined operation of the [SHIFT] key 14a and the right direction "→" of the cursor key 15 is executed when the cursor Cu is present in a numerical expression created by the integral function, the CPU 21 moves the cursor Cu to the outside in the cursor operation direction of the numerical expression created by the integral function, as illustrated in part (B1) of FIG. 11. If the same operation is further executed, the CPU 21 moves the cursor Cu to the outside in the cursor operation direction of a numerical expression created by the mixed fraction function, as illustrated in part (C) of FIG. 11.

In this manner, in the case where the numerical expressions are created in the state of a nested structure by combining a plurality of input field-equipped functions, if the cursor Cu is present in the inner numerical expression, the cursor Cu can be moved to the outside in the cursor operation direction of the inner numerical expression in accordance with the operation of large movement. Furthermore, in accordance with the same operation, the cursor Cu can be moved to the outside of the outer numerical expression. Therefore, even within the complex mathematical expression in which a plurality of numerical expressions are combined by using a plurality of numerical expression creation functions, the cursor Cu can easily be moved to a position before/after an arbitrary numerical expression by the same operation.

Incidentally, the methods of the respective processes by the scientific calculator 10 described in each of the embodiments, that is, the respective methods of the mathematical expression display processes illustrated in the flowcharts of FIG. 4 and FIG. 9, can all be stored as computer-executable programs in an external storage medium (23) such as a memory card (ROM card, RAM card, etc.), a magnetic disk (floppy disk, hard disk, etc.), an optical disc (CD-ROM, DVD, etc.), or a semiconductor memory, and can be distributed. In addition, the computer of the electronic device including a display unit (16) reads the program, which is stored in the external storage medium (23), into the storage device (22), and the operation is controlled by this read-in program. Thereby, it is possible to realize the inverse number mode switching function and mathematical expression display control function, which have been described in each of the embodiments, and to execute the same processes by the above-described methods.

In addition, the data of the program for realizing each of the above-described methods can be transmitted over the network N in the form of a program code, and the data of the program can be taken in the computer of the electronic device including the display unit (16) connected to the network N by the communication unit (25), thereby realizing the above-described inverse number mode switching function and mathematical expression display control function.

The present invention is not limited to the above-described embodiments. In practice, various modifications may be made without departing from the spirit of the invention. In addition, the above-described embodiment includes inventions in various stages, and various inventions can be derived from proper combinations of structural elements disclosed herein. For example, even if some structural elements in all the structural elements disclosed in the embodiments are omitted or some structural elements are combined in different modes, if the problem described in the "Technical Problem" can be solved and the advantageous effects described in the specification can be achieved, the structure, in which the structural elements are omitted or combined, can be derived as an invention.

What is claimed is:

1. An electronic device comprising:
    a display unit; and
    a processor configured to:
    accept an input of numerical expression data comprising an input field-equipped function data with one or plural input fields;
    cause the display unit to display the numerical expression data and a cursor;
    move, upon accepting a first user operation, the cursor from one element to a next or previous element, the element being a constituent of numerical expression data; and
    move, upon accepting a second user operation when the cursor is present in the input fields, the cursor to an outside of the input field-equipped function data with the input fields.

2. The electronic device of claim 1, wherein the processor is configured to move, upon accepting a second user operation when the cursor is not present in the input fields, the cursor from one element to a next or previous element, the element being constituent of numerical expression data.

3. The electronic device of claim 1, wherein the processor is configured to move, upon accepting the second user operation when the cursor is present in the input fields of the input field-equipped function data with three input fields of the input field-equipped function data with the input fields, the cursor to an outside of the input field-equipped function data with the input fields.

4. The electronic device of claim 1, wherein the processor is configured to move, when the cursor is present in the input field-equipped function data with the input fields, the cursor to an outside of the input field-equipped function data with the input fields, upon accepting an operation of a combination of a specific key and a cursor key as the second user operation.

5. The electronic device of claim 1, wherein the processor is configured to move, upon accepting the second user operation when the cursor is present in first input field-equipped function data with the input fields and is present in second input field-equipped function with the input fields, the cursor to a position in a cursor direction immediately before or immediately after the second input field-equipped function with the input fields.

6. The electronic device of claim 1, wherein the processor is configured to move, upon accepting the second user operation when the cursor is present in a term constituting a numerical expression data part outside the input field-equipped function data with the input fields, the cursor to a position before or after a part excluding a sign of the term.

7. The electronic device of claim 1, wherein the electronic device comprises the display unit, and a key group or a touch panel, and the user operations on the key group or the touch panel is accepted.

8. A mathematical expression display control method in an electronic device, comprising:
    accepting an input of numerical expression data comprising an input field-equipped function data with one or plural input fields;
    causing a display unit to display the numerical expression data and a cursor;
    moving, upon accepting a first user operation, the cursor from one element to a next or previous element, the element being a constituent of numerical expression data; and
    moving, upon accepting a second user operation when the cursor is present in the input fields, the cursor to an outside of the input field-equipped function data with the input fields.

9. A non-transitory computer readable storage medium having stored therein instructions, which when executed by a device, cause the device to:
    accept an input of numerical expression data comprising an input field-equipped function data with one or plural input fields;
    cause a display unit to display the numerical expression data and a cursor;
    move, upon accepting a first user operation, the cursor from one element to a next or previous element, the element being a constituent of numerical expression data; and
    move, upon accepting a second user operation when the cursor is present in the input fields, the cursor to an outside of the input field-equipped function data with the input fields.

* * * * *